United States Patent
Cheng et al.

(10) Patent No.: US 6,963,750 B1
(45) Date of Patent: Nov. 8, 2005

(54) CDMA POWER CONTROL FOR PAGING AND INITIAL TRAFFIC CHANNEL POWER

(75) Inventors: Terry Si-Fong Cheng, Randolph, NJ (US); Ching Yao Huang, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1207 days.

(21) Appl. No.: 09/163,396

(22) Filed: Sep. 30, 1998

(51) Int. Cl.$^7$ ................................................ H04Q 7/20
(52) U.S. Cl. ........................ 455/458; 455/561; 455/522
(58) Field of Search ........................... 455/458, 561, 455/572, 436, 69, 522; 370/252, 335, 342; 375/140, 105

(56) References Cited

U.S. PATENT DOCUMENTS

| | | | |
|---|---|---|---|
| 5,487,180 A | * | 1/1996 | Ohtake ........................ 455/69 |
| 5,893,035 A | * | 4/1999 | Chen .......................... 455/69 |
| 6,118,767 A | * | 9/2000 | Shen et al. .................. 455/522 |

FOREIGN PATENT DOCUMENTS

| | | |
|---|---|---|
| EP | 0668664 A1 | 8/1995 |
| WO | WO97/47094 | 12/1997 |

OTHER PUBLICATIONS

Seung Jong Park, et al., "Optimal Power Allocation in CDMA Forward Link Using Dependcy between Pilot and Traffic Channels", 1999, pp. 223-227.
European Search Report.

* cited by examiner

*Primary Examiner*—Melur Ramakrishnaiah

(57) ABSTRACT

A code-division multiple access power control for paging channel power and initial traffic channel power dynamically determines optimum initial channel power in accordance with pilot signal strength of a pilot signal as received at a mobile station and current forward link loading of the desired sector. The optimum initial paging channel power and initial traffic channel power may be determined either at a base station or a mobile switching center of the mobile communication system. A paging signal or call is transmitted from the base station to the mobile station over a paging channel and a traffic channel at the optimum paging channel and initial traffic channel power.

26 Claims, 2 Drawing Sheets

CDMA POWER CONTROL FOR PAGING AND INITIAL TRAFFIC CHANNEL POWER

FIELD OF THE INVENTION

1. Technical Field

The present invention relates to CDMA power control for dynamically determining optimum paging and initial traffic channel power to reduce call origination failure in a mobile communication system.

2. Description of the Background Art

Call origination failure in conventional CDMA (code division multiple access) mobile communication systems typically occurs when the mobile station fails to receive a base station (BS) acknowledgment signal, a channel assignment message (CAM), a forward acknowledgment (FW) signal or a service connecting (SC) message. Table 1 lists the failure rate of each of the above-noted call origination failures. The BS acknowledgment failure (34.38% failure rate) is the major reason for call origination failure. BS acknowledgment failure occurs when a mobile station transmits an access probe to a base station to request a connection from the mobile communication system and the forward paging channel power from the base station to the mobile station is insufficient such that an acknowledgment is not received at the base station.

TABLE 1

|  | No BS ACK | No CAM | No FW ACK | NO SC | Other |
|---|---|---|---|---|---|
| Failure Rate % | 34.38 | 9.38 | 31.25 | 20.31 | 4.69 |

IS-95-B is a mobile-to-base station compatibility standard for dual-mode wide band spread spectrum. The access probe handoff is an IS-95-B scheme for improving call origination failure by performing a handoff to another paging channel when a mobile station loses a paging channel. However, the access probe handoff fails to fundamentally resolve a base station acknowledgment failure. For example, the access probe handoff merely determines which paging channel to switch to and thus provides no adjustment of paging channel power. The access probe handoff fails when the forward link power of the paging channels is insufficient.

Generally, base station acknowledgment failure may be reduced by increasing paging channel power. Currently, the average DGU (digital gain unit) for a traffic channel is in the range of 67–75 and the constant DGU set for the paging channel is 64. Table 2 lists call origination failure rates derived from field test results for a baseline case of paging channel DGU=64, initial traffic channel DGU=80, T50m=0.2 seconds and T51m=1.0 second. In this example, a time limit of T51m=1.0 second is set for the mobile station to report to the base station the receipt of two good traffic channel frames transmitted from the base station. The second good traffic channel frame must be received within a time limit of T50m=0.2 seconds after the first good traffic channel frame. If a report acknowledging receipt of two good traffic channel frames is not sent to the base station within T51m=1.0 second after the mobile station tunes to the particular traffic channel, the call is dropped. In the baseline case, 13.03% of all calls failed and 4.48% of all calls failed due to base station acknowledgment failure, which is 34.38% of all the failed calls.

TABLE 2

| CASE | Actual Failure rate % | No BS ACK % | No CAM % | No FW ACK % | NO SC % | Other % |
|---|---|---|---|---|---|---|
| 0 Baseline | 13.03 (100) | 4.48 (34.38) | 1.22 (9.38) | 4.07 (31.25) | 2.65 (20.31) | 0.61 (4.69) |
| 1 PG DGU = 90 Traffic DGU = 108 | 13.38 (100) | 2.12 (15.87) | 1.06 (7.94) | 7.86 (58.73) | 1.70 (12.70) | 0.64 (4.76) |
| 2 T50m = 1 sec T51m = 2.8 sec | 10.14 (100) | 3.86 (38.10) | 0.97 (9.52) | 0.72 (7.14) | 2.66 (26.19) | 1.93 (19.05) |
| 3 PG DGU = 90 Traffic DGU = 108 T50m = 1 sec T51m = 2.8 sec | 7.26 (100) | 1.21 (16.67) | 0.4 (5.56) | 2.42 (33.33) | 3.02 (41.67) | 0.02 (2.78) |

The test results of Table 2 show that increased paging channel DGU improves base station acknowledgment failure rate by more than 50%, as can be appreciated in view of Case 1 as compared to the baseline case. However, increased paging channel power can have a negative impact on mobile communication system capacity in terms of system power budget. As more power is allocated to the paging channel, less power is available for traffic channels. Also, system noise increases as paging channel power increases, which contributes to increased interference. As can be further appreciated in view of Case 1, although increased paging channel power reduces base station acknowledgment failure rate, forward signal acknowledgment failure rate increases significantly due to increased interference. This results in a reduction of about 2.5 forward link users. To alleviate this negative impact, the T50m and T51m time limits may be increased as in Case 2, such that base station acknowledgment failure rate may be improved. However, this approach is impractical since the mobile units must be serviced to change the T50m and T51m time limits.

SUMMARY OF THE INVENTION

In the present invention, paging channel power and initial traffic channel power are determined in accordance with current RF conditions and are dynamically set so that channel power can be increased when RF conditions are poor and decreased when RF conditions are good. The present invention determines optimum paging channel power and initial traffic channel power in accordance with pilot signal strength of a pilot signal received at a mobile station and current forward link loading of the base station. The base station then transmits a paging message or a call to the mobile station over a paging channel and a traffic channel at the determined optimum paging channel power and the determined optimum initial traffic channel power.

DETAILED DESCRIPTION OF THE PREFERRED EMBODIMENTS

Figure 1:
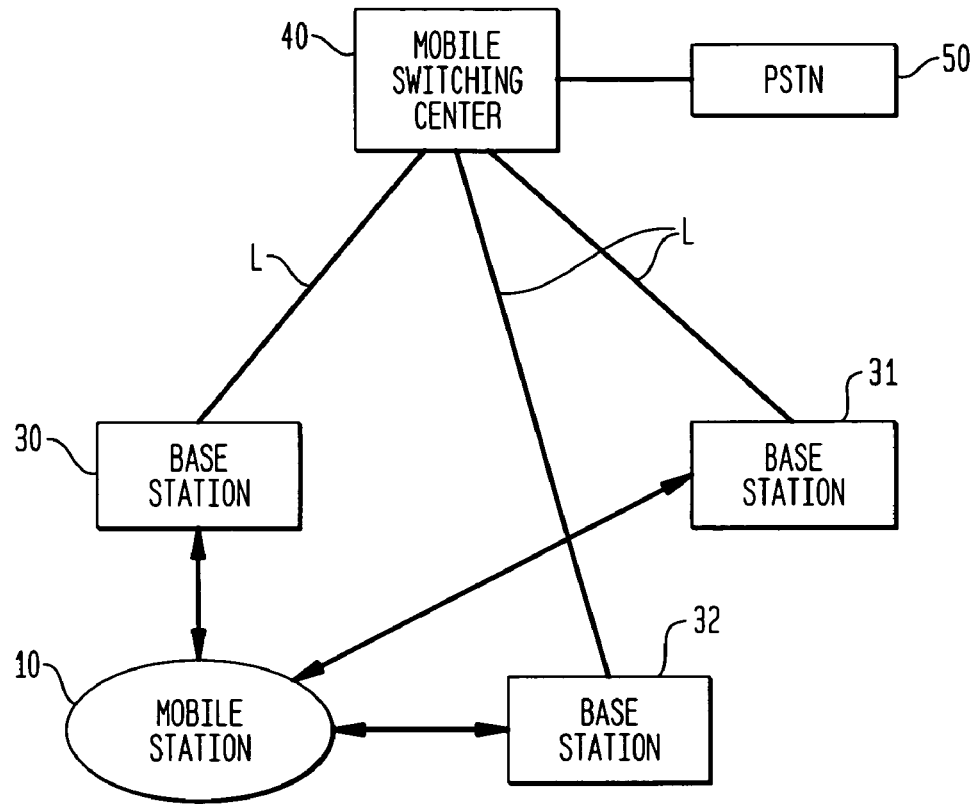
FIG. 1 illustrates a mobile communication system of a preferred embodiment of the present application.

FIG. 1 illustrates a CDMA mobile communication system of a preferred embodiment of the present application. As illustrated in FIG. 1, the mobile communication system includes a plurality of base stations 30, 31 and 32 which transmit and receive communication signals to/from mobile station 10. Although not illustrated, each of base stations may cover respective sectors. Mobile switching center 40 is coupled to the plurality of base stations 30–32 via communication lines L and is further coupled to public switched telephone network (PSTN) 50 to enable communication between mobile station 10 and another party on PSTN 50. Although three respective base stations are illustrated, it is to be understood that the mobile communication system may include any number of base stations.

Figure 2:
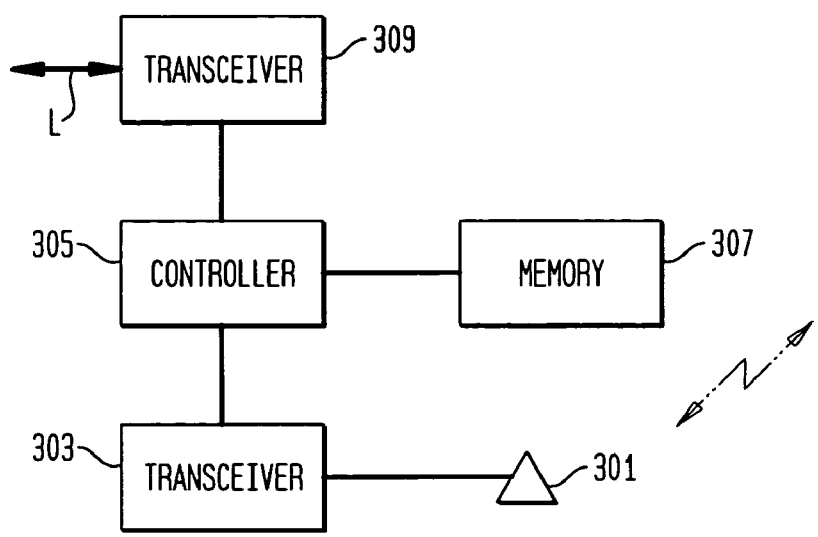
FIG. 2 illustrates base station 30 of FIG. 1 in greater detail.

FIG. 2 illustrates base station 30 in greater detail. Transceiver 303 transmits and receives RF signals to/from mobile station 10 via antenna 301. Transceiver 303 and antenna 301 may be any conventional transceiver and antenna and may function in a conventional duplexing mode to enable transmission and reception of the RF signals. In the alternative, transceiver 303 may be replaced with a separate transmitter and receiver pair and antenna 301 may include a transmission antenna and a reception antenna. Transceiver 303 demodulates and filters RF signals received from mobile station 10 via antenna 301 and provides the corresponding demodulated received signal to controller 305. Transceiver 303 also modulates and amplifies a transmission signal provided from controller 305 and provides the modulated transmission signal to antenna 301 for transmission as an RF signal to mobile station 10.

Base station 30 further includes transceiver 309 which transmits and receives signals to/from mobile switching center 40 via communication lines L. Transceiver 309 may be any conventional transceiver as would be known by one of ordinary skill. In an alternative embodiment, transceiver 309 may comprise a transmitter and receiver pair for transmitting and receiving signals to/from message switching center 40 over a pair of communication lines L.

Operation of base station 30 is controlled by controller 305 in a manner which will be subsequently described. Controller 305 may be a microprocessor which controls operation of base station 30 in accordance with software programming stored in memory 307. As would be readily understood by one of ordinary skill, controller 305 may in the alternative comprise various discrete hardware circuit elements and should not necessarily be limited as microprocessor-based. In addition to storing operating programs for base station 30, memory 307 also includes working memory which may be used by controller 305.

Figure 3:
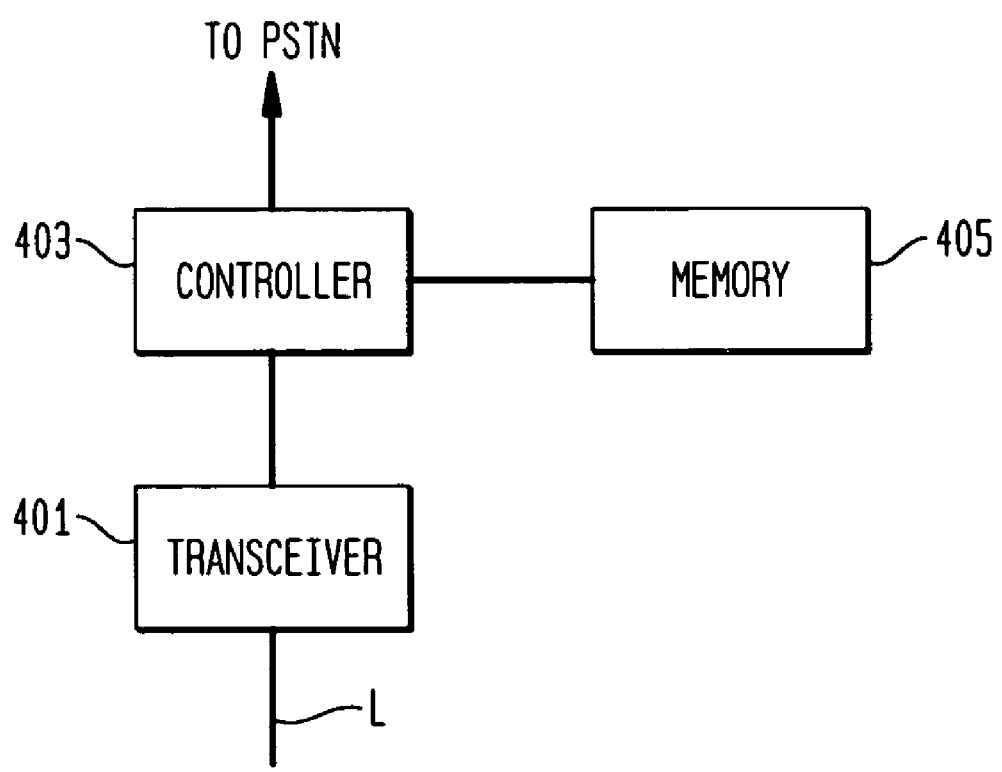
FIG. 3 illustrates message switching center 40 of FIG. 1 in greater detail.

FIG. 3 illustrates mobile switching center 40 in greater detail. Transceiver 401 is coupled to communication lines L to receive and transmit signals from/to the base stations 30–32. Transceiver 401 may be any conventional transceiver usable in a mobile switching center as would be understood by one of ordinary skill. In an alternative embodiment, transceiver 401 may comprise a transmitter and receiver pair for transmitting and receiving signals separately over a pair of communication lines L. The operation of mobile switching center 40 is controlled by controller 403 as will be described subsequently in greater detail. Controller 403 may be microprocessor-based and may function to control operation of mobile switching center 40 in accordance with software programming stored within memory 405. Memory 405 may also include working memory area usable by controller 403. Controller 403 is also coupled to PSTN 50.

Operation of a preferred embodiment of the present application will now be described with reference to FIGS. 1–3. The following notation is used throughout the desription.

$$\frac{Ec}{Io}$$

is the pilot power or pilot signal strength of a pilot signal received at the mobile station. L_F is the current forward link loading of a base station within the desired sector. The current forward link loading is derived as the ratio of the current transmitted power of the base station to the maximum transmitted power of the base station. L_F may be determined by controller 305 of base station 30 based on the $$\frac{Ec}{Io}$$

of the pilot signal as reported by the base station. The maximum transmitted power of a base station is typically 8 watts. T_pilot is the transmitted pilot power from a base station of the desired sector and is set usually at 15–20% of the maximum transmitted power of the base station. F_pilot is the fraction of transmitted pilot power to transmitted maximum power of a base station and is typically 15%. P_pilot is received pilot power at the mobile station.

$$\left(\frac{Eb}{No}\right)p$$

is the required quality of the paging channel, or in other words the required bit energy level of the paging channel.

$$\left(\frac{Eb}{No}\right)t$$

is the required quality of the traffic channel, or in other words the required bit energy level of the traffic channel.

$$\left(\frac{Eb}{No}\right)p \text{ and } \left(\frac{Eb}{No}\right)t$$

are usually set at 7 dB, but may be conservatively set to 9 dB if desired. It is to be understood that the values given above are exemplary and may be set as desired and thus should not be considered as limiting.

In the preferred embodiment, mobile station 10 of FIG. 1 first locks on to the strongest pilot signal and generates a pilot measurement message (PSMM) which identifies the received pilot signal and the pilot signal strength $$\left(\frac{Ec}{Io}\right).$$

For example, upon locking onto a pilot signal from base station 30, mobile station 10 transmits the PSMM to base station 30. Controller 305 of base station 30 then determines optimum paging channel power and initial traffic channel power in accordance with software programming stored within memory 307 based on the reported pilot signal strength and current forward link loading. The interference ratio of internal interference generated within the desired sector or cell and external interference created by other cells plus noise, the assumed orthogonal factor O and required quality $$\left(\frac{Eb}{No}\right)p \text{ and } \left(\frac{Eb}{No}\right)t$$

which are either known or easily derived, are used to determine optimum paging channel power and initial traffic channel power at a particular time as follows.

In detail, the mobile reported pilot signal strength may be expressed as:

$$\frac{Ec}{Io} = \frac{P\_pilot}{I\_in + I\_out}, \quad (1)$$

wherein I_in and I_out are internal interference and external interference respectively, including thermal noise. The inverse of pilot signal strength may be expressed as:

$$\left(\frac{Ec}{Io}\right)^{-1} = \frac{I\_in}{P\_pilot} + \frac{I\_out}{P\_pilot}. \quad (2)$$

Since pilot power is a fixed percentage of the total maximum output power of base station 30, the ratio of internal interference to received pilot power at mobile station 10 can be expressed as:

$$\frac{I\_in}{P\_pilot} = \frac{T\_total \times L\_F \times \text{Prop Loss}}{T\_total \times F\_pilot \times \text{Prop Loss}} = \frac{L\_F}{F\_pilot}. \quad (3)$$

Substituting equation (3) into equation (2) results in the following:

$$\frac{I\_out}{P\_pilot} = \left(\frac{Ec}{Io}\right)^{-1} - \frac{L\_F}{F\_pilot} \equiv A. \quad (4)$$

From equation (4), I_out=P_pilot×A, so that the ratio of external interference to internal interference of other cells plus noise may be expressed as:

$$\frac{I\_out}{I\_in} = \frac{P\_pilot \times A}{P\_pilot \times \frac{L\_F}{F\_pilot}} = \frac{A \times F\_pilot}{L\_F}. \quad (5)$$

The required received paging channel power P_page may be expressed in terms of target quality $$\left(\frac{Eb}{No}\right)p$$

as:

$$P\_page = \left(\frac{Eb}{No}\right)p \times (O \times I\_in + I\_out), \quad (6)$$

wherein O is the orthogonal factor for internal interference. Since Walsh codes are used in a CDMA mobile communication system, the channels of the respective sectors are orthogonal and thus do not interfere with each other during demodulation. However, multipath signals from a single source exist in a CDMA mobile communication system. Even if the multipath signals are transmitted at the same time, they will not be received by the mobile station at the same time due to time delays caused by reflection from objects. The corresponding received channel therefore may not be exactly orthogonal, therefore increasing internal interference. The orthogonal factor provides a measure of internal interference due to multipath. Typically, the orthogonal factor may be set to 0.1 or 0.2.

Equations (6) and (7) express the required received paging channel power P_page in terms of the required quality of the paging channel $$\left(\frac{Eb}{No}\right)p$$

and internal and external interference. The ratio of required received paging channel power P_page to internal interference I_in generated within the sector is equivalent to the ratio of required transmitted paging channel power T_page to current transmitted power T_in generated within the sector because the propagation loss between the base station and the mobile station at a given instant are the same. This relationship may be expressed as:

$$\frac{T\_page}{T\_in} = \frac{P\_page}{I\_in}. \quad (7)$$

The required transmit paging channel power T_page may thus be solved for by substituting equation (6) into equation (7), so that $$\frac{T\_page}{T\_in} = \frac{\left(\frac{Eb}{No}\right)p \times (O \times I\_in + I\_out)}{I\_in}. \tag{8}$$

From equation (5), I_out may be expressed as:

$$I\_out = I\_in \times \frac{A \times F\_pilot}{L\_F}. \tag{9}$$

Substituting equation (9) into equation (8) results in the following:

$$\frac{T\_page}{T\_in} = \left(\frac{Eb}{No}\right)p \times \left(O + \frac{A \times F\_pilot}{L\_F}\right), \tag{10}$$

which may be rearranged as:

$$T\_page = T\_in \times \left(\frac{Eb}{No}\right)p \times \left(O + \frac{A \times F\_pilot}{L\_F}\right). \tag{11}$$

T_in may be expressed as:

$$T\_in = L\_F \times \frac{T\_pilot}{F\_pilot}. \tag{12}$$

By substituting equation (11) into equation (12), the required transmitted paging channel power, or optimum initial paging channel power, T_page may finally be expressed as:

$$T\_page = T\_pilot \times \frac{L\_F}{F\_pilot} \times \left(\frac{Eb}{No}\right)p \times \left(O + \frac{A \times F\_pilot}{L\_F}\right). \tag{13}$$

Since all the values of equation (13) are known or may be determined once the pilot signal strength of the pilot signal is reported by the mobile station, the required transmitted paging channel power for the corresponding RF and forwarding loading conditions may be determined by controller 305. Controller 305 then controls transceiver 303 to transmit the corresponding paging message over a paging channel to mobile station 10 via antenna 301 at the required transmitted paging channel power. Since the optimum paging channel power is determined dynamically in accordance with current RF conditions, paging channel power can be increased only when needed, to the extent needed. Likewise, paging channel power can be decreased when RF conditions permit. Thus, system power budget is allocated efficiently and generated interference is minimized.

In a further preferred embodiment, optimum paging channel power may be determined by controller 403 of mobile switching center 40 in accordance with software stored within memory 405. In this embodiment, the PSMM is generated by mobile station 10 and transmitted to base station 30. Base station 30 subsequently sends the PSMM to mobile switching center 40 via lines L. Controller 403 then determines the required transmitted paging channel power for base station 30 based upon the PSMM and current forward link loading of base station 30 as determined based on the reported pilot signal strength in accordance with equation (13) as described in the first embodiment. Controller 403 then directs transceiver 401 to send information indicative of the required transmitted paging channel power to base station 30, which thereafter transmits the paging message to mobile station 10 over a paging channel at the required transmitted paging channel power. An advantage of this embodiment is that paging channel power may be controlled and set by mobile switching center 40 without base station software and resources.

In a still further embodiment, optimum initial traffic channel power may be determined in accordance with the pilot signal strength as reported from the mobile station as follows:

$$T\_traffic = T\_pilot \times \frac{L\_F}{F\_pilot} \times \left(\frac{Eb}{No}\right)t \times \left(O + \frac{A \times F\_pilot}{L\_F}\right). \tag{14}$$

Equation (14) is the same as equation (13), except that the required quality of the traffic channel $$\left(\frac{Eb}{No}\right)t$$

is used in equation (14) instead of the required quality of the paging channel $$\left(\frac{Eb}{No}\right)p$$

of equation (13). As in the first and second embodiments, the required traffic channel power may be determined at base station 30 or may be determined at mobile switching center 40.

It is to be understood that the programming necessary for carrying out processing described in accordance with the above-noted embodiments is not to be limited as stored within memories 307 and 405 of base station 30 and mobile switching center 40 of FIGS. 2 and 3, respectively. The programming may be recorded on a computer readable medium such as a floppy disk or CD ROM readable by controller 305 and 403 of base station 30 and mobile switching center 40, respectively. In a further alternative, the programming may be transmitted to controller 305 of base station 30 from mobile switching center 40 via propagated signal along line L.

It is also to be understood that the power control for paging channel power and initial traffic channel power should not necessarily be limited in view of the corresponding figures, description exemplary values. For example, the values of maximum transmitted power, T_pilot, F_pilot, $$\left(\frac{Ec}{No}\right)t, \left(\frac{Ec}{No}\right)p$$

and orthogonal factor O may be preset by the service provider and may be stored within memories 307 and 405.

Moreover, although controller 305 of base station 30 and controller 403 of mobile switching center 40 are described as microprocessor-based which function in accordance with software programming respectively stored in memories 307 and 305, controllers 405 and 403 may be discreet circuit elements including multipliers and adders or logical gate arrays. Furthermore, controllers 305 and 403 may have memories incorporated therein such that memories 307 and 405 of FIGS. 2 and 3 are not necessary. Also, power control for initial paging channel and initial traffic channel power as described should not necessarily be limited to CDMA systems, but may be applicable to any mobile communication system as may be appropriate.

What is claimed is:

1. A base station of a mobile communication system comprising:
   a transmitter that wirelessly transmits a pilot signal and a paging message to a mobile station of the mobile communication system; and
   a controller that determines optimum paging channel power in accordance with pilot signal strength of the pilot signal wirelessly received by the mobile station,
   said transmitter wirelessly transmitting the paging message to the mobile station over a paging channel at the optimum paging channel power.

2. The base station of claim 1, wherein said controller determines optimum paging channel power in accordance with the pilot signal strength and forward loading of the base station,
   the forward loading of the base station being a ratio of current transmitted power of the base station to maximum transmitted power of the base station.

3. The base station of claim 1, wherein said controller also determines an optimum initial traffic channel power in accordance with the pilot signal strength.

4. The base station of claim 1, wherein the mobile communication system is CDMA mobile communication system.

5. A mobile switching center of a mobile communication system, the mobile switching center being supplied with indication of pilot signal strength of a pilot signal received wirelessly by a mobile station of the mobile communication system, the mobile switching center comprising:
   a controller that determines optimum paging channel power for wireless transmission of a paging message to the mobile station in accordance with the pilot signal strength of the pilot signal.

6. The mobile switching center of claim 5, wherein said controller supplies information indicative of the optimum paging channel power to a base station of the mobile communication system, the paging message being wirelessly transmitted from the base station to the mobile station at the optimum paging channel power.

7. The mobile switching center of claim 6, wherein said controller determines the optimum paging channel power in accordance with the pilot signal strength and forward loading of the base station,
   the forward loading of the base station being a ratio of current transmitted power of the base station to maximum transmitted power of the base station.

8. The mobile switching center of claim 5, wherein said controller also determines an optimum initial traffic channel power in accordance with the pilot signal strength.

9. The mobile switching center of claim 5, wherein the mobile communication system is a CDMA mobile communication system.

10. A method of controlling transmission power of a base station of a mobile communication system comprising the steps of:
    wirelessly transmitting a pilot signal to a mobile station of the mobile communication system;
    determining optimum paging channel power in accordance with pilot signal strength of the pilot signal wirelessly received by the mobile station; and
    wirelessly transmitting a paging message to the mobile station over a paging channel at the optimum paging channel power.

11. The method of controlling transmission power of claim 10, wherein said step of determining comprises determining optimum paging channel power in accordance with the pilot signal strength and forward loading of the base station,
    the forward loading of the base station being a ratio of current transmitted power of the base station to maximum transmitted power of the base station.

12. The method of controlling transmission power of claim 10, wherein the base station determines the optimum paging channel power.

13. The method of controlling transmission power of claim 10, wherein a mobile switching center of the mobile communication system determines the optimum paging channel power.

14. The method of controlling transmission power of claim 10, further comprising:
    determining optimum initial traffic channel power in accordance with the pilot signal strength; and
    wirelessly transmitting a call to the mobile station over a traffic channel at the optimum initial traffic channel power.

15. The method of controlling transmission power of claim 10, wherein the mobile communication system is a CDMA mobile communication system.

16. An article of manufacture taking the form of a computer-readable medium for controlling transmission power of a base station in a mobile communication system, the article of manufacture comprising:
    a pilot transmission source code segment for causing a computer within the base station to wirelessly transmit a pilot signal to a mobile station of the mobile communication system;
    a paging channel determination source code segment for causing the computer to determine an optimum paging channel power in accordance with pilot signal strength of the pilot signal wirelessly received by the mobile station; and
    a paging transmission source code segment for causing the computer to wirelessly transmit a paging message to the mobile station over a paging channel at the optimum paging channel power.

17. The article of manufacture of claim 16, wherein said paging channel determination source code segment causes the computer to determine the optimum paging channel power in accordance with the pilot signal strength and forward loading of the base station,
    the forward loading of the base station being a ratio of current transmitted power of the base station to maximum transmitted power of the base station.

18. The article of manufacture of claim 16, further comprising:
    a traffic channel determination source code segment for causing the computer to determine an optimum initial traffic channel power in accordance with the pilot signal strength; and a traffic channel transmission source code segment for causing the computer to wirelessly transmit a call to the mobile station over a traffic channel at the optimum initial traffic channel power.

19. The article of manufacture of claim 16, which controls transmission power of the base station in a CDMA mobile communication system.

20. An article of manufacture taking the form of a computer readable medium for controlling transmission power of a base station of a mobile communication system, the article of manufacture comprising:

a paging channel determination source code segment for causing a computer of a mobile switching center of the mobile communication system to determine optimum paging channel power in accordance with pilot signal strength of a pilot signal wirelessly received by a mobile station of the mobile communication system; and a paging channel transmission source code segment for causing the computer to direct a base station to wirelessly transmit a paging message to the mobile station over a paging channel at the optimum paging channel power.

21. The article of manufacture of claim 20, wherein the paging channel determination source code segment causes the computer to determine the optimum paging channel power in accordance with the pilot signal strength and forwarding loading of the base station, the forward loading of the base station being a ratio of current transmitted power of the base station to maximum transmitted power of the base station.

22. The article of manufacture of claim 20, further comprising:

a traffic channel determination source code segment for causing the computer to determine optimum initial traffic channel power in accordance with the pilot signal strength of the pilot signal; and a traffic channel transmission source code segment for causing the computer to direct the base station to wirelessly transmit a call to the mobile station over a traffic channel at the optimum initial traffic channel power.

23. The article of manufacture of claim 20, which controls transmission power in a CDMA mobile communication system.

24. A propagated signal embodied in a carrier wave for controlling transmission power of a base station of a mobile communication system, the propagated signal comprising:

a pilot transmission source code segment for causing a computer within the base station to wirelessly transmit a pilot signal to a mobile station of the mobile communication system;

a paging channel determination source code segment for causing the computer to determine an optimum paging channel power in accordance with pilot signal strength of the pilot signal wirelessly received by the mobile station; and a paging transmission source code segment for causing the computer to wirelessly transmit a paging message to the mobile station over a paging channel at the optimum paging channel power.

25. The propagated signal of claim 24, wherein said paging channel determination source code segment causes the computer to determine the optimum paging channel power in accordance with the pilot signal strength and forward loading of the base station, the forward loading of the base station being a ratio of current transmitted power of the base station to maximum transmitted power of the base station.

26. The propagated signal of claim 24, further comprising:

a traffic channel determination source code segment for causing the computer to determine an optimum initial traffic channel power in accordance with the pilot signal strength; and a traffic channel transmission source code segment for causing the computer to wirelessly transmit a call to the mobile station over a traffic channel at the optimum initial traffic channel power.

* * * * *